United States Patent [19]

Dolci

[11] Patent Number: 5,791,706
[45] Date of Patent: Aug. 11, 1998

[54] MULCH SHOVEL

[75] Inventor: Rocky J. Dolci, 416 Church St., Groveville, N.J. 08620

[73] Assignee: Rocky J. Dolci, Groveville, N.J.

[21] Appl. No.: 883,408

[22] Filed: Jun. 26, 1997

[51] Int. Cl.$^6$ ............................................. A01B 1/20
[52] U.S. Cl. ........................... 294/51; 294/55; 294/55.5
[58] Field of Search ................... 294/2, 7, 49, 51, 294/52, 55, 55.5, 59; 7/114–116; 15/236.08; 30/137, 142, 169, 322; 56/400.04, 400.07, 400.11, 400.21

[56] References Cited

U.S. PATENT DOCUMENTS

| | | | |
|---|---|---|---|
| 421,364 | 2/1890 | Vaag | 294/51 |
| 674,117 | 5/1901 | Lefebvre | 294/51 |
| 720,500 | 2/1903 | Spillane | 294/51 |
| 969,307 | 9/1910 | Sumerlin | 294/51 |
| 1,435,061 | 11/1922 | Halsey | 294/51 |

*Primary Examiner*—Johnny D. Cherry
*Attorney, Agent, or Firm*—Samuel Louis Sachs

[57] ABSTRACT

A mulch shovel includes a longitudinal extending handle having a longitudinal axis and a first and second distal end with a transverse member disposed proximate the first distal end transverse to the longitudinal axis; a scoop shaped-member has a rear end with a device disposed therein for receiving the second distal end of the handle; also included on the scoop-shaped member are side upwardly extending walls and a front end having a plurality of loops displaced from the front end, which are aligned in a plurality of rows with each being suitable for receiving a tine therein. The scoop-shaped member front end has a leading edge disposed parallel to the transverse member and side edges sloped at an acute angle from the leading edge.

11 Claims, 2 Drawing Sheets

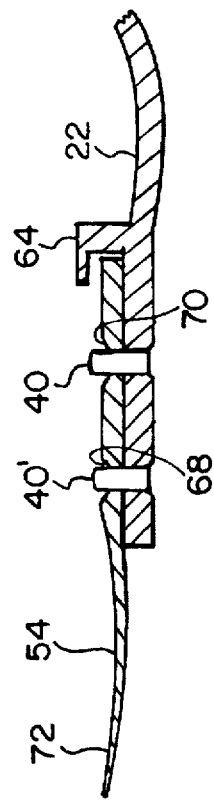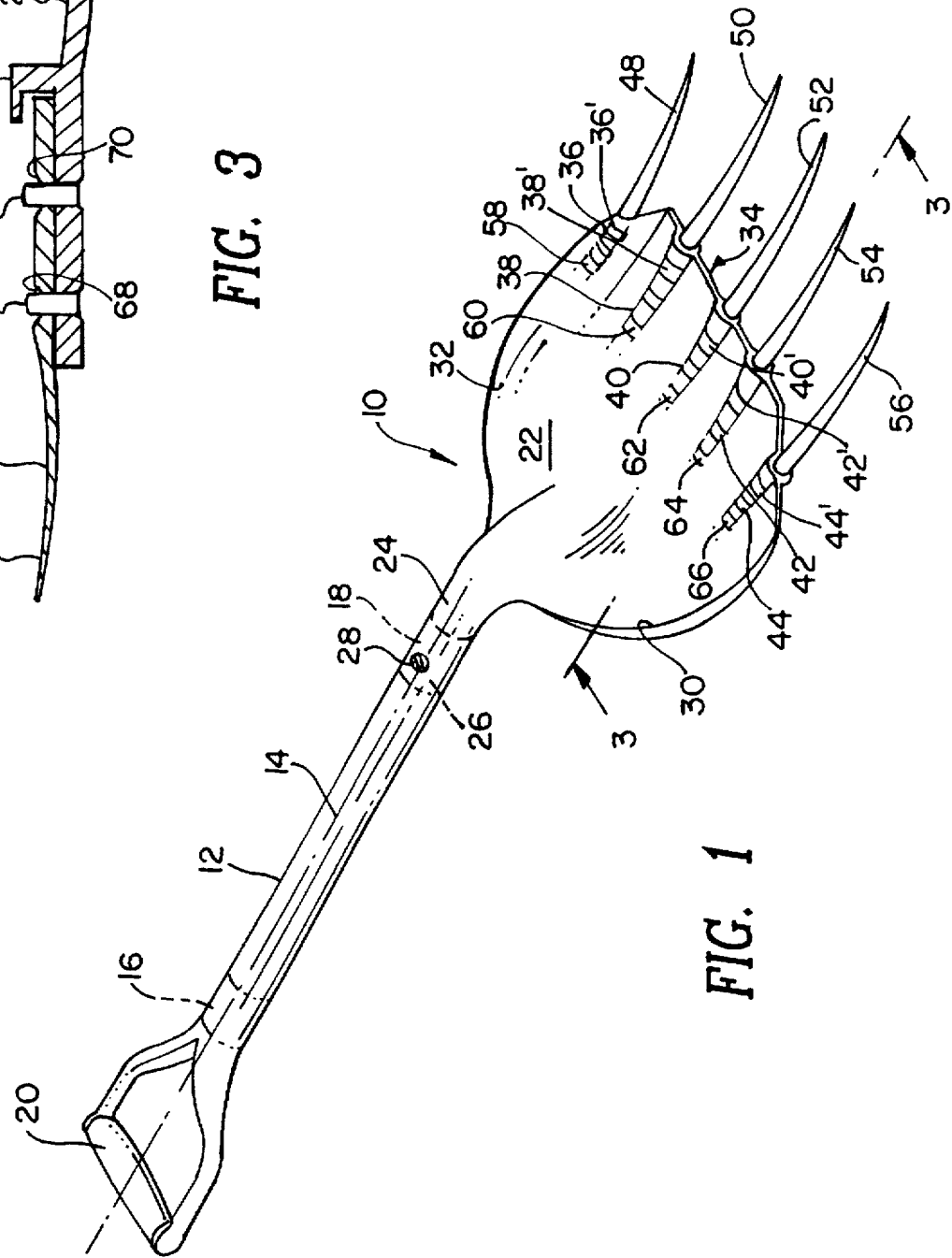

MULCH SHOVEL

BACKGROUND OF THE INVENTION

1. Field of the Invention

The present invention relates to a hand implement and more particularly to an implement, which is employed specifically to scoop up mulch, since it has the ability to break up the mulch and then carry it to another position.

2. Discussion of the Relevant Art

The prior arts abounds with numerous types of hand held instruments and/or shovels used for different purposes. Typical of which is U.S. Pat. No. 1,435,061 issued to Halsey on Nov. 7, 1922, which discloses an ice chipper scoop that is utilized for chopping ice, as well as, being able to move the ice to another location after it has been reduced into small pieces.

Another U.S. Pat. No. 1,935,510, issued to Lofton on Nov. 14, 1933 discloses a shovel having a means for attaching thereto a plurality of tines, which may be used for breaking up material, that is to be moved to another location.

The present invention overcomes the shortcomings found in the prior art and may be used as a mulch shovel or as a spade.

Therefore, it is an object of the present invention to provide a hand implement or shovel capable of breaking up material that is to be moved, prior to lifting it and placing it in another location.

It is yet another object of the present invention to provide a mulch shovel, which is provided with a plurality of tines extending beyond the front edge of the scoop portion of the shovel for breaking up the material to be moved.

It is still yet another object of the present invention to provide a hand held implement or shovel that has readily replaceable tines.

It is still yet a further object of the present invention to provide a hand held implement that may be used with or without the extending tines.

SUMMARY OF THE INVENTION

A mulch shovel, according to the principles of the present invention, includes a longitudinal extending handle having a longitudinal axis and a first and second distal end; a transverse member is disposed proximate the first distal transverse to the longitudinal axis; a scoop shaped member has a rear end with a device disposed therein for receiving the second distal end of the handle. Also included on the scoop shaped member are side upwardly extending walls and a front end having a plurality of loops displaced from the front end that are aligned in a plurality of rows adapted to receive a tine therein. The scoop shaped member front end has a leading edge disposed parallel to the transverse member and side edges sloped at an acute angle from the leading edge.

The foregoing and other objects and advantages will appear from the description to follow. In the description reference is made to the accompanying drawing, which forms a part hereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWING

In order that the invention may be more fully understood, it will now be described, by way of example, with reference to the accompanying drawing in which:

FIG. 1 is a pictorial representation of a mulch shovel, according to the principles of the present invention;

FIG. 3 is a partial cross-sectional view in elevation, taken along the line 3—3 of FIG. 1.

DESCRIPTION OF THE PREFERRED EMBODIMENT

Figure 2:
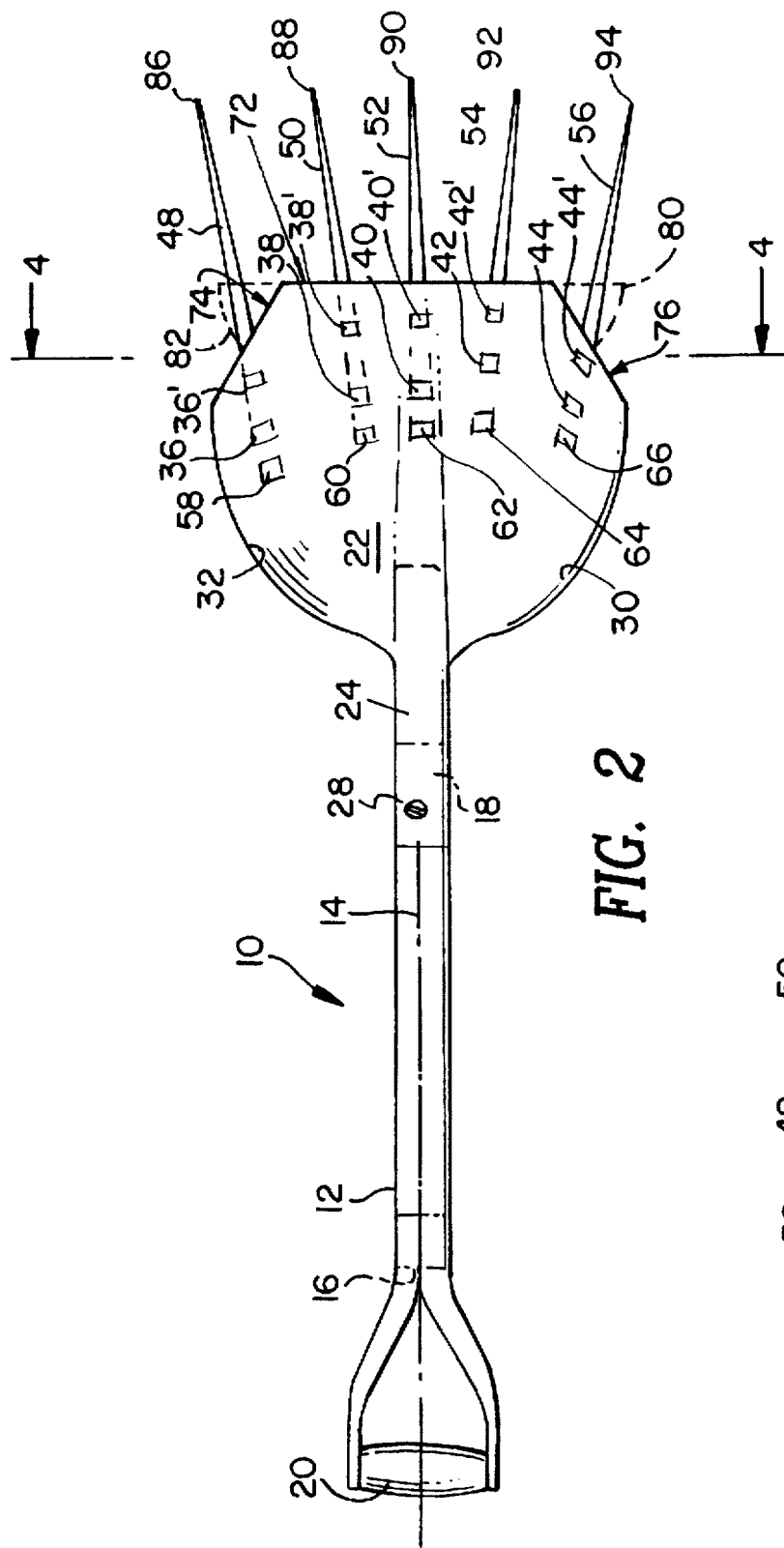
FIG. 2 is a top plan view of the mulch shovel shown in FIG. 1.

Referring now to the figures, and in particular to FIGS. 1 and 2, there is shown a mulch shovel 10, according to the principle, of the present invention, which is seen to include a longitudinally extending handle 12 with a longitudinal axis 14 having a first distal end 16 and a second distal end 18. A gripping member 20 is disposed transverse to the longitudinal axis 14 and is affixed to the first distal end 16 of the handle 12, in a conventional manner, to provide sufficient leverage for using the mulch shovel 10. A scooped-shaped member 22 has a rear end 24 with a hollow portion 26 into which the handle 12 is inserted and may be affixed therein by a screw 28 to prevent the scoop shaped member 22 from rotating about the longitudinal axis 14.

The scoop-shaped member 22 is provided with side upwardly extending walls 30 and 32 and a front end 34. The front end 34 is provided with a plurality of loops 36, 36', 38, 38', 40, 40', 42, 42', 44 and 44' aligned in a row. Each of the rows 36, 36', 38, 38', 40, 40' and 42, 42', 44 and 44' is designed to receive tines 48, 50, 52, 54, and 56, therein respectively. At the rear end of the loops 36, 38, 40, 42, and 44 there is provided a stop portion 58, 60, 62, 64, and 66, respectively (shown more clearly in FIG. 3), which allows the tine 54 to be inserted into loops 40 and 40' and stops the tine 54 in the correct position so that the detents 68 and 70 may properly engage the loops 40' and 40, respectively, maintaining the tines in a rigid position so that they will not be loosened when the mulch shovel 10 is in use. However, since they are not permanently affixed, they may readily be removed by applying pressure to the end and tip 72 of the tine 54 and rotating it so that the detents are not in alignment with the loops 40 and 40', therefore, making it readily removed if desired. The remaining tines are inserted into their associated loops in the same manner.

Figure 4:
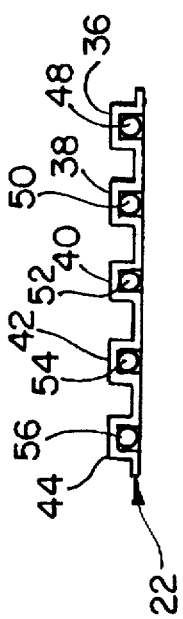
FIG. 4 is a cross-sectional view, in elevation, taken along the line 4—4 of FIG. 1.

Referring now to FIG. 4, which is a cross-sectional view, in elevation, taken along the line 4—4 of FIG. 1, wherein the tines 48, 50, 52, 54 and 56 (shown solid for clarity) are disposed within the loops 36, 38, 40, 42 and 44, respectively.

Referring now specifically to FIG. 2, it may be seen that the scoop-shaped member 22 is provided with a leading edge 72 that is parallel to the gripping member 20 and has side edges 74 and 76 that form an obtuse angle 80 and 82 from the front edge 72 of the scoop-shaped member 22, thereby allowing the tines 48 and 56 disposed in the side edge portion 74 and 76 to extend beyond the width of the scooped-shaped member 22. The tines 48, 50, 52, 54 and 56 are provided with pointed ends to make it easier to pierce the material that has to be moved and making it easier for the scooped shaped member 22 to more readily acquire the material.

In operation, if the mulch shovel is to be used with the tines, they are inserted manually into the loops 36 through 44 of the scooped-shaped member 22 of the mulch shovel 10 as indicated in FIGS. 1-4 and the mulch shovel is ready to be used. If for any reason it is desirable to use the scooped-shaped member 22 of the shovel 10 without the pointed tines, they may be readily removed by clamping the tine and rotating it to free it from the loops 36 through 44.

Hereinbefore has been disclosed a relatively inexpensive mulch shovel, which may be used with or without the tines inserted therein. The tines, if they should wear out or break, may readily be replaced as has been described.

It will be understood that various changes in the details, materials, arrangements of parts and operating conditions, which have been herein described and illustrated in order to explain the nature of the invention may be made, by those skilled in the art, within the principles and scope of the instant invention.

Having thus set forth the nature of the invention, what is claimed is:

1. A mulch shovel comprising:
   A. a longitudinally extending handle having a longitudinal axis and a first and second distal end;
   B. a transverse member disposed proximate said first distal end transverse to said longitudinal axis;
   C. a scoop-shaped member having,
      a) a rear end with means disposed thereon for receiving said second distal end of said handle,
      b) side upwardly extending walls, and
      c) a front end having,
         i) a plurality of loops displaced from said front end, said loops being aligned in a plurality of rows, each of said rows being adapted to receive a tine therein,
         ii) a leading edge disposed parallel to said transverse member,
         iii) side edges sloped at an obtuse angle from said leading edge; and
      d) a plurality of tines adapted to cooperate with and be received into each of said rows of loops having two ends.

2. A mulch shovel according to claim 1, wherein each of said rows of loops is provided with a stop portion at the end closest to said scoop-shaped member rear end.

3. A mulch shovel according to claim 1, wherein each said tine is provided with a detent slot proximate one end adapted to cooperate with each loop in a row into which said tine is inserted to increase its ability to be retained therein.

4. A mulch shovel according to claim 1, wherein each said tine includes;
   a) a detent slot proximate one end adapted to cooperate with each said loop in a row into which said tine is inserted to increase its ability to be retained therein, and
   b) a tapered point at the other end.

5. A mulch shovel according to claim 1, wherein at least one of said rows of loops is disposed in each of said front end side edges.

6. A mulch shovel according to claim 1, wherein said shovel has at least one of said rows of loops disposed in said front end side edges and at least three of said rows of loops are disposed on said front end leading edge.

7. A mulch shovel according to claim 1, wherein said side upwardly extending walls extend to said scoop-shaped member rear end.

8. A mulch shovel comprising:
   A. a longitudinally extending handle having a longitudinal axis and a first and second distal end;
   B. a transverse member disposed proximate said first distal end transverse to said longitudinal axis;
   C. a scoop-shaped member having;
      a) a rear end with means disposed thereon for receiving said second distal end of said handle,
      b) side upwardly extending walls extending to said scoop-shaped member rear end, and
      c) a front end having a plurality of loops displaced from said front end, said loops being aligned in a plurality of rows, each of said rows having a stop portion at the end closest to said scoop-shaped member rear end and adapted to receive a tine therein, said scoop-shaped member front end having a leading edge disposed parallel to said transverse member with side edges sloped at an obtuse angle from said leading edge, and
      d) a plurality of tines, having two ends, adapted to cooperate with and be received into each said row of loops, said tines being provided with a detent slot proximate one end adapted to cooperate with each loop in a row into which said tine is inserted to increase its ability to be retained.

9. A mulch shovel according to claim 8, wherein each said tine includes;
   a) a detent slot proximate one end adapted to cooperate with each said loop in a row into which said tine is inserted to increase its ability to be retained therein, and
   b) a tapered point at the other end.

10. A mulch shovel according to claim 8, wherein at least one of said rows of loops is disposed in said side edges.

11. A mulch shovel according to claim 8, wherein said shovel has at least one of said rows of loops disposed in said front end side edges and at least three of said rows of loops are disposed on said front end leading edge.

* * * * *